Feb. 17, 1953　　M. R. LUDWIG　　2,629,060
PHASE MODULATING APPARATUS
Filed Oct. 30, 1950

INVENTOR.
MERLE R. LUDWIG
BY
George H. Fisher
ATTORNEY

Patented Feb. 17, 1953

2,629,060

UNITED STATES PATENT OFFICE 2,629,060

PHASE MODULATING APPARATUS

Merle R. Ludwig, Minneapolis, Minn., assignor to Minneapolis-Honeywell Regulator Company, Minneapolis, Minn., a corporation of Delaware Application October 30, 1950, Serial No. 194,721

10 Claims. (Cl. 307—24)

The present invention is concerned with an electro-mechanical phase modulating apparatus and more particularly a phase modulating apparatus wherein it is desired to have two output signals which are phase modulated and varying in phase in opposite directions with respect to each other.

In certain types of control apparatus, it is necessary that a phase modulated signal be provided which will be varied at a rate which is synchronized with the signal which is being modulated. Further, some control apparatus requires two phase modulated signals which have their phase modulation continuously varying in opposite directions or senses. Attempts to produce such signals by purely electronic means were not too successful and the resultant apparatus was not too satisfactory because of the difficulty of synchronizing the carrier signal with the modulating signal.

It is therefore an object of the present invention to provide a new and improved electro-mechanical phase modulating apparatus.

A further object of the present invention is to provide an improved modulating apparatus wherein the carrier frequency is modulated by a frequency which is synchronized with the carrier frequency.

Another object of the present invention, is to provide an improved phase modulating apparatus wherein an electro-mechanical apparatus phase modulates a pair of alternating current signals continuously in an opposite sense or direction.

Still another object of the present invention is to change two phase modulated signals which vary in quadrature into pulses which vary sinusoidally in time phase relation with respect to each other.

Figure 1:
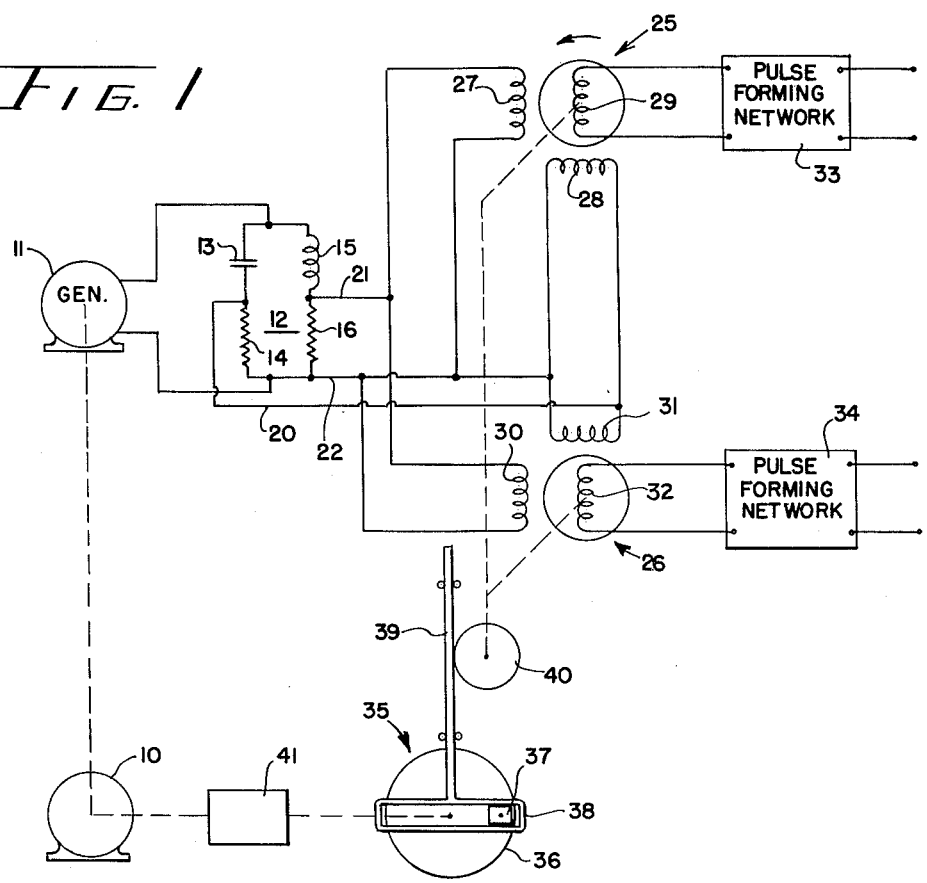
Figure 2:
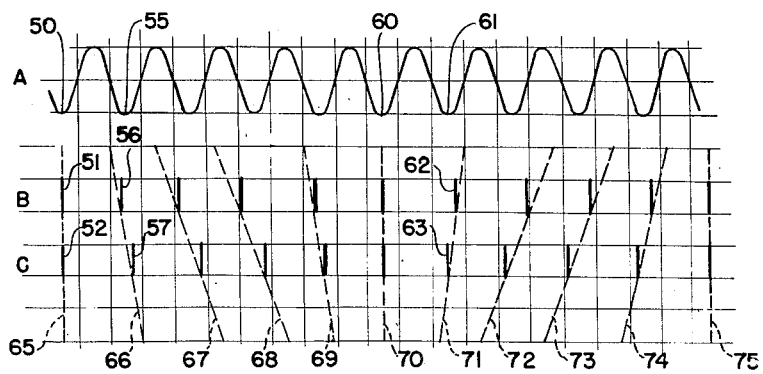

These and other objects of the present invention will be understood upon considering the following specification and the drawings, of which:

Figure 1 is a diagrammatic showing of the present phase modulating apparatus; and Figure 2 is a graphical showing of the electrical signals produced by the apparatus when in operation.

Referring first to Figure 1, the numeral 10 represents a driving motor which has its output connected to drive an alternating current generator 11. The frequency of the output of the generator 11 will be dependent upon the speed of rotation of the motor 10. The output signal from the generator 11 is fed to a phase splitting network 12. This phase splitting network comprises two parallel electrical circuits, the first comprising a condenser 13 connected in series with a resistor 14 and the second comprising an inductance 15 connected in series with a resistor 16. The output of the phase splitter 12 is taken on conductors 20 and 21 when measured with respect to a common conductor 22. The phase of the alternating current signal appearing between conductors 21 and 22 is 90° displaced from the alternating current signal appearing between conductors 20 and 22.

The output signals from the phase splitter 12 are fed to a pair of control transformers 25 and 26. The transformer 25 comprises a pair of primary windings 27 and 28 which are spaced 90 electrical degrees apart, or for purposes of simplification in the drawing, 90 mechanical degrees, and a movable or rotatable armature 29. The control transformer 26 comprises a pair of primary windings 30 and 31 and a movable or rotatable armature 32. The field windings 30 and 31 are spaced 90 electrical degrees apart or as shown upon the drawing 90 mechanical degrees.

The output windings 29 and 32 are fed into suitable pulse shaping networks 33 and 34, respectively, which networks are effective to convert the alternating current input into a chain of pulses, each pulse representing one cycle of the input signal.

A mechanism for driving the armatures 29 and 32 of the control transformers 25 and 26 respectively is a mechanical oscillating device sometimes referred to as a Scotch yoke 35. This oscillating mechanism comprises a circular driving wheel 36 which carries a pivoted block 37. The block 37 is arranged for transverse movement within a raceway 38 and causes the raceway 38 to move up and down in a vertical direction, as shown upon the drawing, as the driving wheel 36 rotates. The raceway 38 is connected to drive a rack 39 which engages a pinion gear 40. For purposes of illustration in the drawing, the wheel 40, with 360° movement of the driving wheel 36, will move 180° and will then reverse back to its initial position. The driving force for the driving wheel 36 is obtained from the motor 10 acting through a suitable gear train 41. The gear train 41, in one embodiment of the invention, was arranged to cut down the speed of the output of the motor 10 so that the frequency of oscillation of the mechanism 35 was $\frac{1}{10}$ the frequency of the output alternating voltage from the generator 11.

Operation

When in operation, the motor 10 is driving both the generator 11 and the oscillating mechanism 35. The alternating current output from the generator 11 is fed through the phase splitter 12 where the alternating current signal is shifted so that the alternating current voltage between the conductors 21 and 22 is 90° displaced from the signal on conductors 20 and 22. The voltage on the conductors 21 and 22 is connected to the primary windings 27 and 30 on the control transformers 25 and 26 respectively. These connections are so arranged that the signal phasing on the primary 27, as viewed upon the drawing, is in phase with respect to the signal phasing on the primary winding 30. The output voltage appearing upon the conductors 20 and 22 is fed to the primary windings 28 and 31. The alternating current phasing on the windings 28 and 31, as viewed upon the drawing, is also the same, but 90° leading with respect to the phasing of windings 27 and 30.

With the armatures 29 and 32 in the position shown upon the drawing, it will be seen that the field arising from the windings 28 and 31 will have no effect upon the output windings 29 and 32, while the primary windings 27 and 30 will be effectively directly coupled to the output windings 29 and 32 respectively.

Referring to Figure 2, the line A represents the alternating current signal or carrier signal appearing upon windings 27 and 30 and, for purposes of explanation, will be considered as the reference signal. Assuming that at the instance that the output windings 29 and 32 are in the position shown upon the drawing and that the reference signal is phased so that the valley 50 will be occurring at that instant, there will be a corresponding peak appearing on the output windings 29 and 32, which peak when fed through the pulse forming networks 33 and 34 will appear as pulses represented as 51 and 52 in lines B and C of Figure 2.

As the output windings are rotated by the Scotch yoke mechanism, assuming the next movement of the windings is in a counter-clockwise direction, it will be noted that the winding 29 will be picking up a signal which is effectively 180° reversed from that appearing on winding 32, as concerns signal picked up from primary windings 28 and 31. Thus, the effect of this is to cause the output signal on winding 29 to lead the reference signal while the signal on winding 32 will lag the reference signal. When the next valley 55 occurs in the reference signal, there will be a peak on the output winding 29 which will appear as a pulse 56 on line B of Figure 2, which is advanced in time phase from the valley 55. In the case of the signal on winding 32, the signal will be lagging the reference signal and as a result, the pulse obtained from the corresponding valley 55 will be lagging in time phase as shown at 57 on line C of Figure 2.

When the Scotch yoke mechanism has rotated the windings 29 and 32 one quarter of a revolution, the time phase difference between the output signals of the carrier on windings 29 and 32 will be a maximum. As the mechanism rotates the windings back again to the initial assumed starting position, the time phasing differential will become less and less until it is the same. Upon the Scotch yoke driving the output windings one quarter of a revolution in the opposite direction, the time phasing of the output signals and the timing of the pulses with respect to the reference signal will reverse. Thus, in Figure 2, the valley 60 in the reference signal will represent the return to the initial position and the valley 61 will represent movement in the opposite direction. The pulses 62 and 63, from the respective networks 33 and 34, will be oppositely displaced in time phase from that during the first portion of the operation. Thus, the pulse 62 will be lagging the valley 61 and the pulse 63 will be leading the valley 61. This relationship will continue and a maximum difference in phase will be reached when the output windings have been rotated one quarter of a revolution in the present direction from the starting point. The time phase difference will go back to zero upon the Scotch yoke driving the output windings back to the initial position.

Another way of indicating how the phasing of the pulses varies is to draw slope lines intersecting the base of the pulses on lines B and C. When the slope line is vertical, as at 65, 70, and 75 the pulses are in phase. When the slope lines have a negative slope as at 66, 67, 68, and 69, the pulses on line B are leading those on line C and by an amount which is proportional to the slope of the interconnecting lines. When the slope lines have a positive slope as at 71, 72, 73 and 74, the pulses on line B are lagging those on line C by an amount proportional to the slope of the lines.

With the motor 10 oscillating the armatures 29 and 32 through the mechanism 35 at a frequency which is $\frac{1}{10}$ the frequency of the output voltage from generator 11, it will be seen that the alternating signal or carrier signal from the generator 11 will be varied in phase as the oscillating mechanism 35 rotates the armatures 29 and 32 in their respective fields of their associated primary windings. The rate of this phase modulation will obviously be dependent upon the frequency of the oscillating mechanism 35 so that by varying the gear train ratio of gear train 41 it is possible to vary the frequency at which the carrier signal is phase modulated by the apparatus. Since motor 10 drives both the generator 11 and the oscillating mechanism 35, the phase modulating signal and carrier will always be synchronized and the pulses on the output of the networks 33 and 34 will be varying in their timing and in directions which are always opposite.

The present electro-mechanical phase modulator produces phase modulated signals which will consistently vary in their respective phase relationship and will not tend to drift but will remain stable as the apparatus is in operation. Further, while the apparatus is arranged for 180° oscillation of the armatures, there may be instances where it is desirable to rotate the armatures more than 180° or even several revolutions. This additional rotation may be obtained by varying the size of the pinion gear 40.

From the foregoing it will be seen that there has been provided a phase modulating apparatus wherein the carrier signal is synchronized with the modulating signal inasmuch as a common driving motor is used to produce the carrier signal as well as the modulating signal. Further, it will be seen that the control apparatus continuously phase modulates the carrier signal and produces two phase modulated signals which are converted into pulses and are continuously varying in opposite senses or directions. While many modifications will be suggested to those skilled in the art, it is intended that the scope of the present invention be limited solely by the appended claims.

I claim as my invention:

1. Apparatus for phase modulating a pair of electrical signals, comprising, an electrical generator having an alternating output voltage, electrical phase splitting means energized by said generator and having two output signals displaced in phase from each other, a pair of independent control transformers each having a rotatable armature and a pair of field windings, said field windings being energized by said two output signals, and mechanical means synchronously rotating said armatures.

2. Apparatus for phase modulating a pair of electrical signals, comprising, an electrical generator having an alternating output voltage, electrical phase splitting means energized by said generator and having two output signals displaced in phase from each other, a pair of independent control transformers each having a rotatable armature and a pair of field windings, said field windings being energized by said two output signals, and mechanical means synchronously oscillating each of said rotatable armatures through a predetermined angle.

3. Apparatus for synchronously phase modulating a pair of electrical signals, comprising, an electrical generator having a motor drive means and an electrical alternating output voltage, electrical phase splitting means energized by said generator and having two output signals displaced in phase from each other, a pair of independent control transformers each having a movable armature carrying an output winding and a plurality of primary windings, each energized by one of said two output signals, mechanical oscillating means connected in driving relation to the armatures of said transformers, and means connecting said motor drive means to said oscillating means to synchronize the operation of said generator with the oscillation of said armature.

4. Apparatus for synchronously and oppositely phase modulating a pair of electrical signals comprising, a drive motor, an alternating current generator driven by said motor, a phase splitting circuit energized by said generator and having a pair of output signals displaced in phase from each other by 90 electrical degrees, a pair of independent control transformers each having a pair of input primary windings and a rotatable armature carrying an output winding, each of said primary windings being displaced 90 electrical degrees apart and being energized by one of said output signals, and a mechanical oscillating mechanism driven by said drive motor and connected to drive said armatures so that the electrical phasing of the output signal on the output windings will be varying at a rate dependent upon the rate of oscillation of said armatures and in opposite directions.

5. Apparatus for synchronously and oppositely phase modulating a pair of electrical signals comprising, a drive motor, an alternating current generator driven by said motor, a phase splitting circuit energized by said generator and having a pair of output signals displaced in phase from each other by 90 electrical degrees, a pair of control transformers each having a pair of input primary windings and a rotatable armature carrying an output winding, each of said primary windings being displaced 90 electrical degrees apart and being energized by one of said output signals, a mechanical oscillating mechanism arranged to oscillatingly move said armatures so that the phasing of the output signal will vary at a rate dependent upon the rate of oscillation of said armatures and in opposite directions, and gear reduction means connecting said drive motor to said mechanism so that the rate of oscillation of said mechanism will be a submultiple of the output frequency of said generator.

6. An alternating current phase modulating apparatus, comprising, a drive motor, a generator driven by said motor and having an alternating output voltage, a control transformer having a plurality of primary windings and a movable armature carrying an output winding, mechanical oscillating means driving said armature, and gear means connecting said motor to said oscillating means to drive said oscillating means at a submultiple frequency of the frequency of said alternating output voltage.

7. An alternating current phase modulating apparatus, comprising, a drive motor, an alternating current generator driven by said motor, a control transformer having a pair of primary windings spaced 90 electrical degrees apart, each energized by said generator by a voltage which is 90 electrical degrees displaced from the voltage on the other, and a rotatable armature having an output winding, oscillating means for driving said armature through 180 electrical degrees with respect to one of said primary windings, and means including said drive motor for driving said oscillating means at a frequency which is less than the frequency of said alternating current generator.

8. An alternating current phase modulating apparatus, comprising, a drive motor, an alternating current generator driven by said motor, a pair of independent control transformers each having a pair of primary windings spaced 90 electrical degrees apart, each of said pair being energized by said generator by a voltage which is 90 electrical degrees displaced in phase from the voltage on the other, and each having a rotatable armature carrying an output winding, oscillating means for simultaneously driving said armatures through 180 electrical degrees and in a direction such that the phase on the outputs of said armatures will be varying in opposite directions, and means including said drive motor for driving said oscillating means at a frequency which is less than the frequency of said alternating current generator.

9. An alternator, electrical circuit means deriving from said alternator a pair of voltages in quadrature, a pair of independent control devices arranged to oppositely select varying portions of said voltages and combine said voltages so that each of said devices has an output whose phase variations vary in a direction opposite that of the other, and means synchronously driving said devices and said alternator.

10. An alternator, electrical circuit means deriving from said alternator a pair of voltages in quadrature, a pair of independent control devices arranged to oppositely select varying portions of said voltages and each having an output whose phase variations vary in a direction opposite that of the other, and pulse forming means connected to each of said devices to form a chain of pulses with the pulses derived from each device varying in time phase direction opposite that of the other.

MERLE R. LUDWIG.

REFERENCES CITED

The following references are of record in the file of this patent:

UNITED STATES PATENTS

| Number | Name | Date |
|---|---|---|
| 1,633,016 | Hartley | June 21, 1927 |